Jan. 8, 1924.
C. H. AYARS
1,480,336
ROTARY MEASURING VALVE
Filed Feb. 27, 1923
2 Sheets-Sheet 1
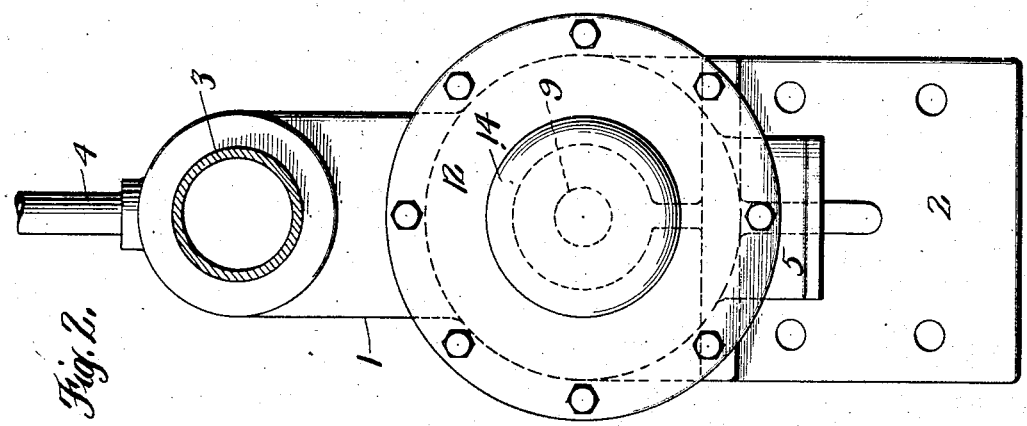
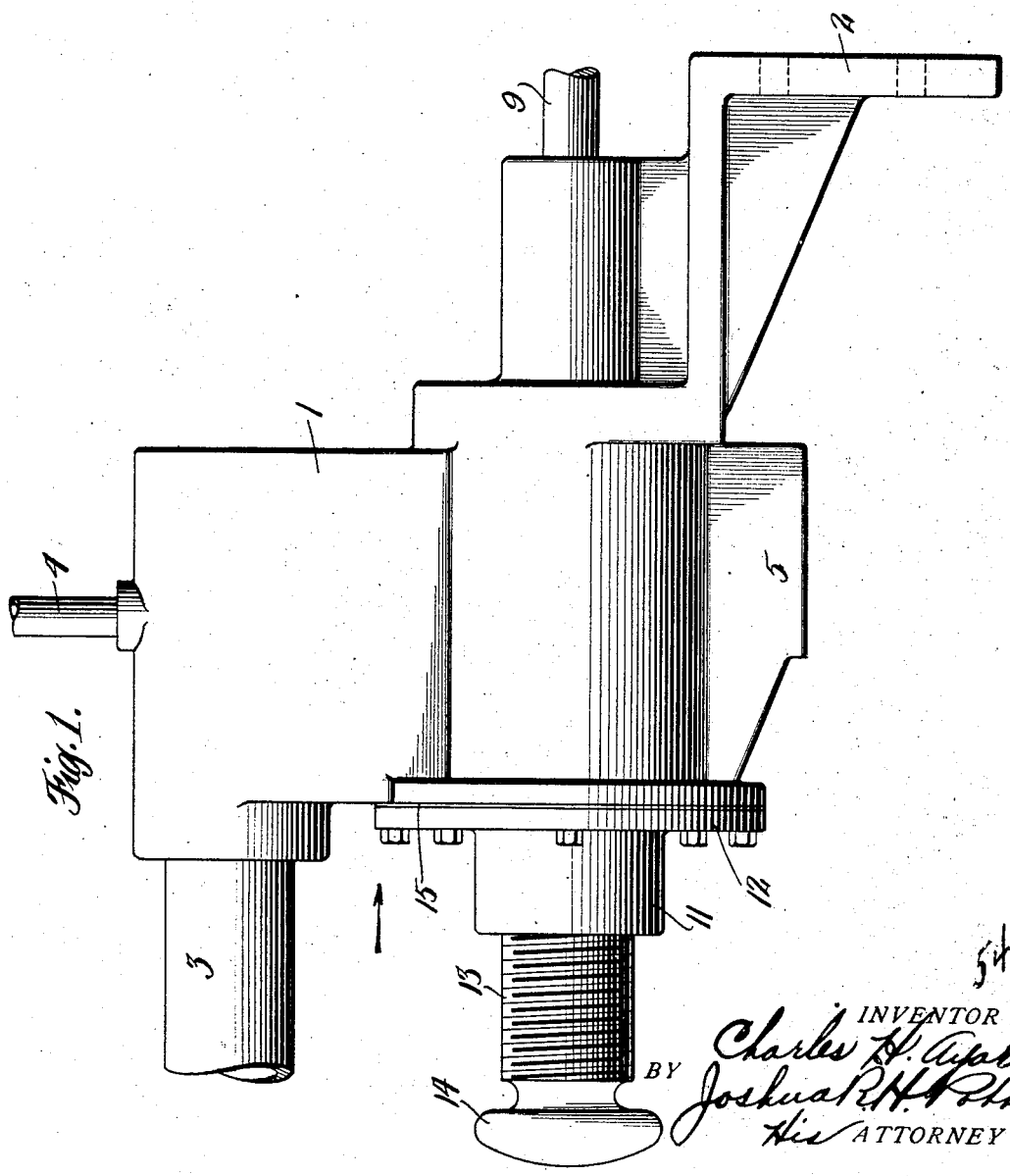
INVENTOR
Charles H. Ayars
BY Joshua R. H. Potts
His ATTORNEY Jan. 8, 1924.  1,480,336
C. H. AYARS
ROTARY MEASURING VALVE
Filed Feb. 27, 1923  2 Sheets-Sheet 2
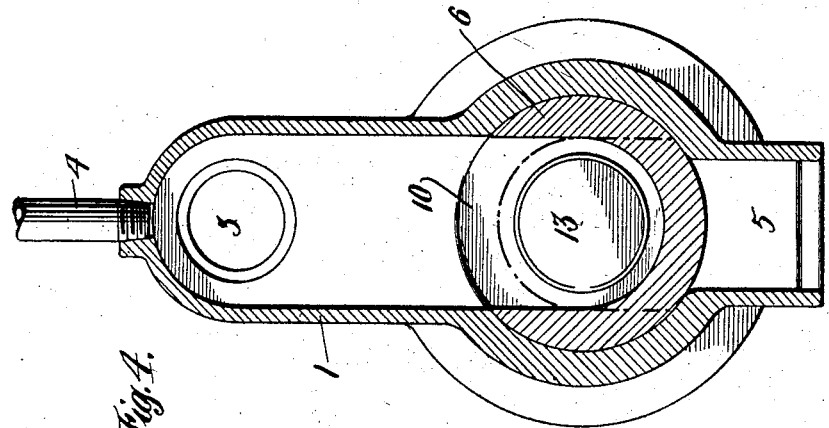
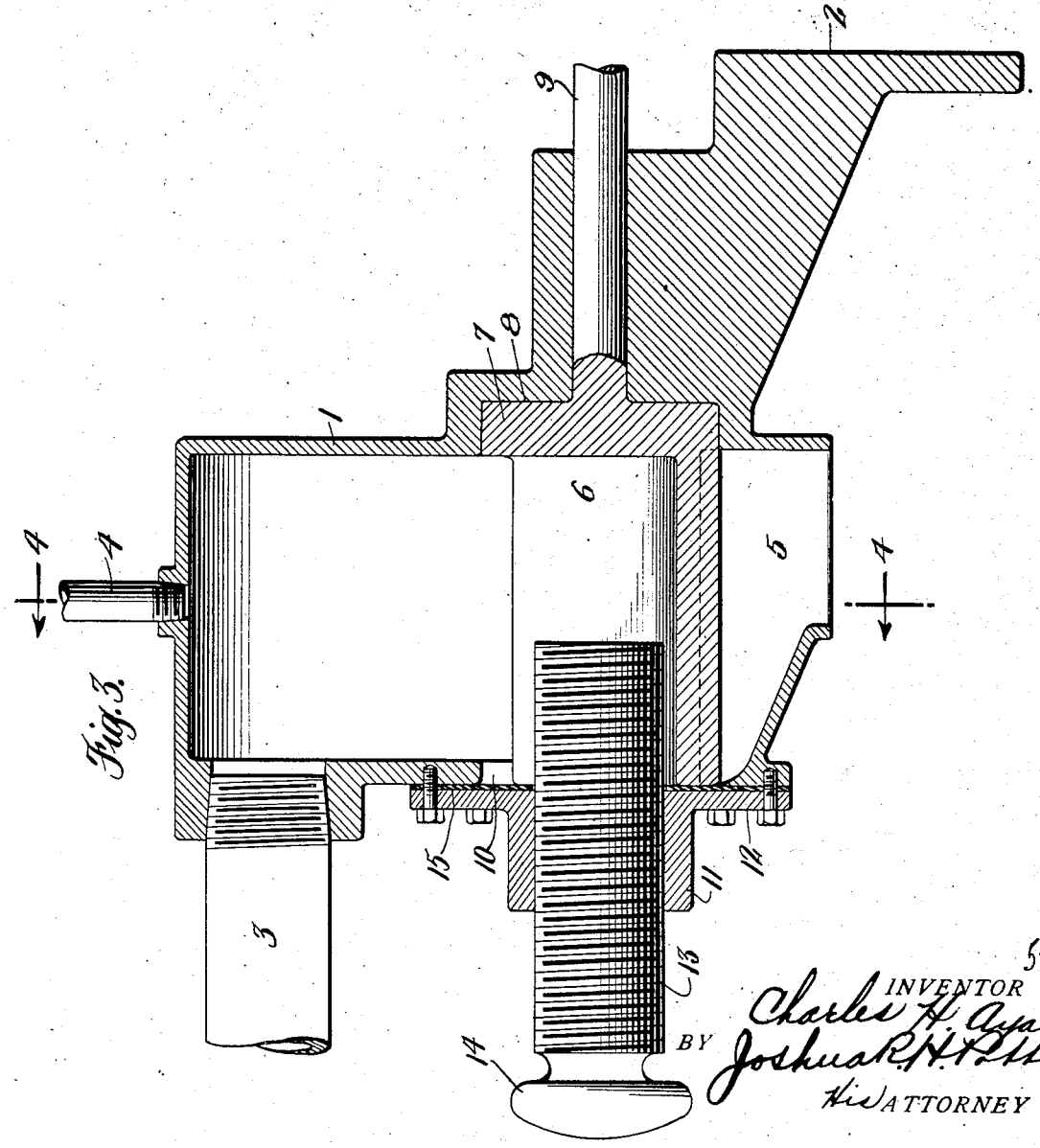

Patented Jan. 8, 1924.

1,480,336

UNITED STATES PATENT OFFICE.

CHARLES H. AYARS, OF SALEM, NEW JERSEY, ASSIGNOR TO AYARS MACHINE COMPANY, OF SALEM, NEW JERSEY.

ROTARY MEASURING VALVE.

Application filed February 27, 1923. Serial No. 621,529.

*To all whom it may concern:*

Be it known that I, CHARLES H. AYARS, a citizen of the United States, residing at Salem, in the county of Salem and State of New Jersey, have invented certain new and useful Improvements in Rotary Measuring Valves, of which the following is a specification.

My invention relates to measuring valves of the rotary type and is especially adapted for use in can filling machines for feeding a measured quantity of liquids to the cans, and the object of the invention is to provide a simple and efficient valve adapted for such use.

This object, and other advantageous ends which will be described hereinafter, I attain in the following manner, reference being had to the accompanying drawings in which:—

Figure 1 is a side elevation of a valve embodying my invention,

Figure 2 an end view looking in the direction of the arrow in Figure 1,

Figure 3 a vertical longitudinal section, some of the parts being shown in elevation, and Figure 4 a vertical section on line 4—4 of Figure 3.

Referring to the drawings, 1 indicates the wall of a liquid receptacle adapted to be supported by a bracket 2, 3 an inlet pipe, 4 an air-vent pipe, 5 a discharge funnel and 6 a U-shaped valve rotatably mounted in the wall of the receptacle. The valve, as shown, has an integral circular end 7 seated in a corresponding recess 8 in the wall of the receptacle, and centrally connected with a shaft 9 having its bearing in bracket 2. At the side opposite the shaft the wall of the receptacle has a circular opening 10 in which the open end of the valve is seated. An internally threaded collar 11 having a flange 12 is secured to the wall of the receptacle over opening 10 and an externally threaded plunger 13 takes through the threaded opening in the collar and is provided with a knob 14 by which it may be rotated. A packing 15 of any suitable material is interposed between the collar and the wall of the receptacle and serves as a liquid seal. The valve, in cross-section is a segment of a cylinder with its side walls sufficiently high to preclude any discharge of liquid into the funnel, during the rotation of the valve, until the mouth of the valve is closed. The shaft may be actuated by any suitable mechanism.

The capacity of the valve may be varied at will by screwing the plunger in or out. Liquid may be fed to the tank through the inlet pipe.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A liquid measuring device consisting of a liquid receptacle; a U-shaped valve having one end seated in a circular recess in the wall of the casing and the other in a circular opening in said wall; a threaded collar having a flange partly closing the opening; a threaded plunger taking through the collar, and means for rotating the valve.

In testimony whereof I have signed my name to this specification in the presence of two subscribing witnesses.

CHARLES H. AYARS.

Witnesses:
CHAS. E. POTTS,
ELIZABETH GARBE.